Jan. 23, 1962   N. L. GROSTICK   3,018,343
BIN LEVEL INDICATOR
Filed March 26, 1959   2 Sheets-Sheet 1
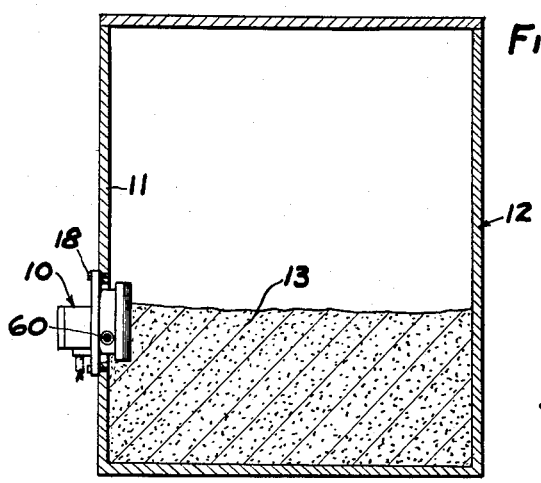
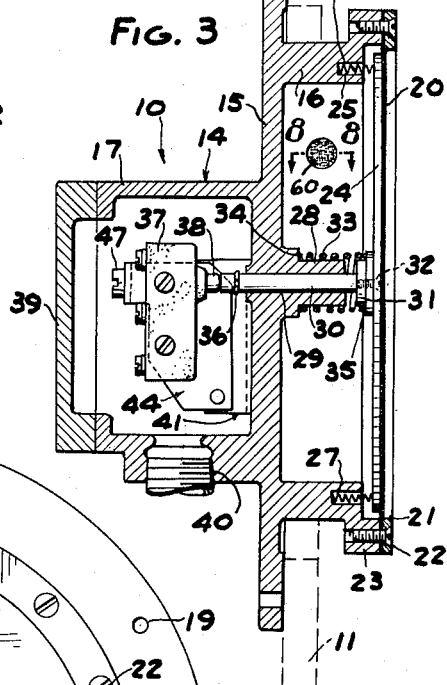
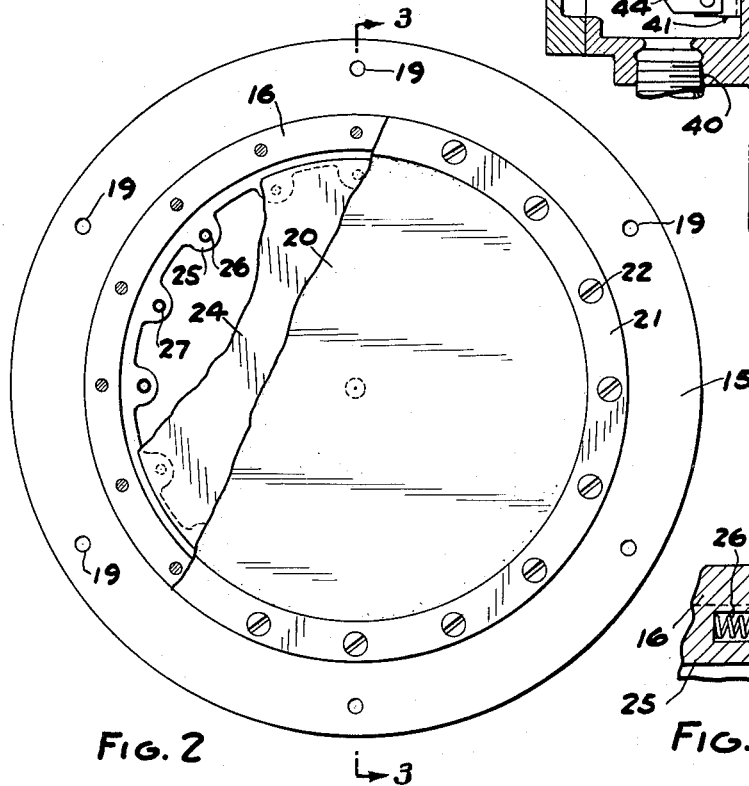
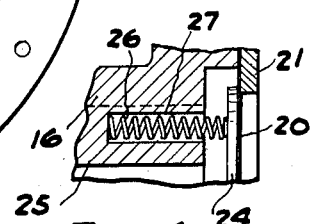
INVENTOR.
NORMAN L. GROSTICK
BY
ATTORNEYS Jan. 23, 1962 N. L. GROSTICK 3,018,343
BIN LEVEL INDICATOR
Filed March 26, 1959 2 Sheets-Sheet 2

INVENTOR.
NORMAN L. GROSTICK
BY
ATTORNEYS

United States Patent Office 3,018,343
Patented Jan. 23, 1962

3,018,343
BIN LEVEL INDICATOR
Norman L. Grostick, Lexington, Mich., assignor to The Bin-Dicator Company, Detroit, Mich., a corporation of Michigan
Filed Mar. 26, 1959, Ser. No. 802,058
13 Claims. (Cl. 200—61.21)

This invention relates to bin level indicators and more particularly to indicators for indicating when the level of comminuted, powdered, granular or lump material in a bin reaches or falls below a predetermined level.

This invention contemplates a diaphragm type level indicator which will effectively indicate when the level of comminuted material reaches or falls below a predetermined value; which will consistently operate when the level changes; which can be easily adjusted; which can be manufactured at low cost; which is easy to maintain; and which is so constructed as to minimize the danger of explosions.

In the drawings:

FIG. 1 is a vertical section through a bin showing in elevation the bin level indicator embodying the subject invention.

FIG. 2 is a side elevation of the bin level indicator embodying the subject invention with parts broken away.

FIG. 3 is a section along the line 3—3 in FIG. 2.

FIG. 4 is a fragmentary sectional view on an enlarged scale of a portion of the indicator shown in FIG. 3.

Figure 5:
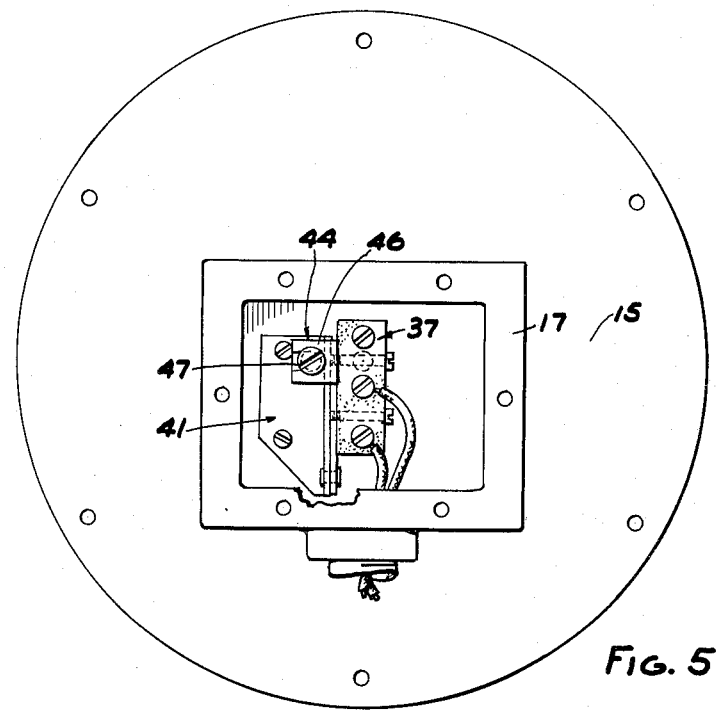
FIG. 5 is a side elevation taken from the side opposite to that shown in FIG. 2 with the cover removed and a part of the housing broken away.

Referring to FIG. 1, bin level indicator 10 embodying the invention is adapted to be mounted in the wall 11 of a bin 12 to indicate when the level of comminuted, powdered, granular or lump material 13 in the bin 12 reaches or rises to or falls below a predetermined value.

Referring to FIGS. 2 and 3, the bin level indicator 10 is of the diaphragm type and comprises a housing 14 which includes a flat circular central wall 15, a cylindrical wall 16 extending from one face of the wall 15 and a rectangular wall 17 extending from the other face of the central wall 15. A portion of the central wall 15 extends beyond the cylindrical wall 16 to provide a mounting flange for mounting the housing adjacent an opening in wall 11. The indicator is mounted in an opening in the bin wall by bolts 18 which extend through openings 19 in wall 15 and are threaded into wall 11 of bin 12.

The cylindrical wall 16 defines an opening which is closed by diaphragm 20 of flexible material such as rubber, thin aluminum or stainless steel. Diaphragm 20 is preferably made of aluminum or stainless steel having a thickness of approximately 0.0075 inch. Diaphragm 20 is held in place by ring 21 and screws 22 which extend through the ring and diaphragm and are threaded into a peripheral flange 23 on the outer end of wall 16. A rigid back-up plate or disc 24 is positioned adjacent the inner surface of diaphragm 20 and extends throughout a major portion of the diaphragm. Back-up plate 24 is of lesser diameter than flange 23 but overlaps wall 16 and is unattached to diaphragm 20. Wall 16 is formed with a plurality of circumferentially spaced bosses 25 adjacent the inner surface thereof. Each boss 25 is provided with an axially extending opening 26 in which a coil spring 27 is positioned. Each coil spring 27 is compressed between the bottom of the opening 26 and the back-up plate 24 to yieldingly urge the back-up plate 24 against the inner surface of the diaphragm 20.

Wall 15 is provided with a boss 28 at the center thereof and an opening 29 extends through boss 28. A rod 30 having an enlarged head 31 is fixed to plate 24 by screw 32. Rod 30 extends through opening 29 and is freely slidable therein, a clearance being provided between rod 30 and opening 29. A helical coil spring 33 is positioned over boss 28 and compressed between a shoulder 34 on wall 15 and a shoulder 35 on back-up plate 34 to yieldingly urge the back-up plate against the inner surface of the diaphragm 20. A snap ring 36 is mounted in a groove on the free end of the rod 30 to limit the outward movement of the rod 30 by the action of the spring 33. The snap ring 36 abuts wall 15 to limit the outward movement of the rod 30.

A micro switch 37 is adjustably mounted in the opening defined by the rectangular wall 14 with the actuating plunger 38 thereof in general alignment with the rod 30. A cover 39 closes the end of the opening defined by the rectangular wall 17. Wall 17 is provided with an opening 40 through which wires may extend to the micro switch 37.

Figure 6:
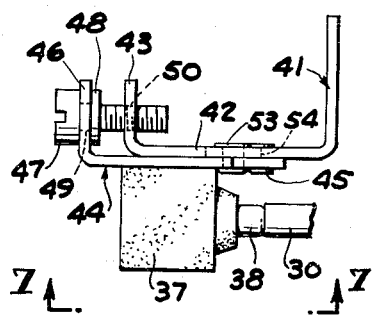
FIG. 6 is a top plan view of the switch mounting bracket shown in FIG. 5.
Figure 7:
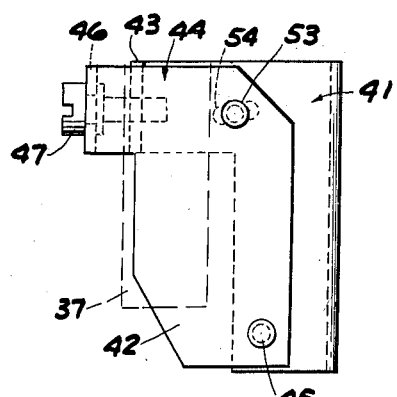
FIG. 7 is a view of the switch mounting bracket as viewed in the direction of the arrows in FIG. 6.

Referring to FIGS. 5, 6 and 7, means are provided for adjustably supporting switch 37 and comprises a bracket 41 mounted on wall 15 and having a flat upstanding portion 42 and a vertical flange 43. A support plate 44 is pivoted to the flat portion 42 by a rivet 45. Plate 44 includes a flange 46 which overlies flange 43 of bracket 41. Switch 37 is mounted on support plate 44 with the axis of the plunger 38 in alignment with the axis of rod 30. A screw 47 having an annular shoulder 48 spaced from the head thereof is journalled in flange 46 of support plate 44 by insertion into a slot 49 in flange 46. Screw 47 is threaded into an opening 50 in flange 43 of bracket 41 so that rotation of the screw 47 will cause the support plate 44 to pivot toward and away from the rod 30 and diaphragm 20 thereby adjusting the position of micro switch 37 relative thereto. The pivotal movement of support plate 44 is limited by a rivet 53 on flat portion 42 of the bracket 41 which extends into an arcuate slot 54 in plate 44.

The means for mounting the switch 37 is more fully disclosed and claimed in the copending application of Norman L. Grostick, Serial No. 748,402, filed July 14, 1958 and titled, Motion Indicator.

In use, the bin level indicator is mounted in position in the side wall of a bin. As the level of comminuted material 13 rises in the bin and reaches the exposed surface of diaphragm 20, the pressure of the material on the diaphragm 20 causes the diaphragm 20 to move inwardly of the housing 14 against the action of the spring 33. As the diaphragm 20 moves inwardly, the back-up plate 24 also moves inwardly causing the rod 30 to move to the left as shown in FIG. 3 and thereby close switch 37 by depressing the plunger 38. Switch 37 will then close an electrical circuit which energizes a signal means or other device which indicates that the comminuted material has reached the predetermined level. Alternatively, switch 37 may be designed to energize controls which control the feeding of the comminuted material to the bin.

When the level of comminuted material lowers so that the pressure on the diaphragm 20 is relieved, the diaphragm is moved outwardly together with the back-up plate 24 by the action of the spring 33 thereby moving the rod 30 away from the plunger 38 of micro switch 37 and opening micro switch 37 to de-energize the control circuit.

As the level of comminuted material rises and reaches the lower portion of diaphragm as viewed in FIG. 3, there is a tendency for the lower end of plate 24 to move to the left causing rod 30 to bind in opening 29. However, circumferentially spaced springs 27 oppose this tendency. As the pressure on the diaphragm increases by a further rise in the level of the comminuted material, a progressively greater number of springs 27 become effective to resist the tendency of plate 24 to cause rod 30 to bind. The action of the circumferentially spaced springs 27 insures a proper operation of the diaphragm 20 and prevents any binding action between the rod 30 and the opening 29 in the boss 28. Accordingly, a consistent and uniform operation of the bin level indicator is assured.

Since the only connection between the diaphragm side of the central wall 15 and the switch side of the central wall is through a single opening 29, and since switch 37 is enclosed completely, the danger of explosions due to spark action from the switch is minimized.

Figure 8:
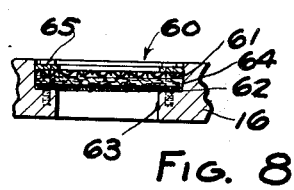
FIG. 8 is a fragmentary sectional view taken along the line 8—8 in FIG. 3.

One or more vents 60 are provided in the wall 16 in order to vent the area of the indicator behind the diaphragm 20 to the atmosphere of the bin. As shown in FIG. 8, the vent 60 comprises a pair of screens 61, 62 positioned in an opening 63 in wall 16 and having a filter cloth 64 of suitable material such as glass fiber interposed between the screens. The screens and cloth are held in position by a press fitted retainer 65.

The vent prevents the creation of pressure or vacuum in the indicator behind the diaphragm 20. Specifically, as the diaphragm 20 is forced back by pressure of the material thereon, the air in the area behind the diaphragm is compressed. Since the opening 29 is substantially sealed by the rod 30, a resultant air pressure is created in the area behind the diaphragm. This tends to slow down or resist the movement of the diaphragm 20. The presence of the vent 60 prevents such a pressure build up and insures a more sensitive operation of the device. Similarly, when the diaphragm moves outwardly after the level of material has gone below the indicator, the springs return the diaphragm to its outer position tending to cause a vacuum to be created behind the diaphragm which resists the return of the diaphragm to its normal position. The vent 60 eliminates such a condition and insures a more sensitive operation. Vent 60 has a further function in equalizing the pressure on the interior of the diaphragm with the pressure in the interior of the bin when the indicator is first installed.

It can be appreciated that by the above construction ready access may be had to the various parts of the bin level indicator for proper maintenance.

Since the housing can be made as a single casting, the cost of manufacture of the bin level indicator is kept at a minimum.

The adjustment of switch 37 toward and away from rod 30 controls the sensitivity of the motion indicator. As switch 37 is moved toward rod 30, a lesser movement of rod 30 is required to actuate the switch and therefore the switch will be more sensitive to a predetermined pressure on diaphragm 20. If switch 37 is moved away from the rod 30, a greater movement of rod 30 will be required to actuate switch 37 and therefore the level indicator will be less sensitive to a change in pressure on diaphragm 20.

It can be appreciated that the bin level indicator can be used either to indicate when the level of comminuted material has reached a predetermined level or when the level of comminuted material has fallen below a predetermined level.

I claim:

1. A bin level indicator comprising a housing having an open face, a diaphragm closing said face of said housing, a back-up plate positioned adjacent said diaphragm in coplanar engagement therewith and extending throughout the major portion of said diaphragm, a switch mounted on said housing and adapted to be actuated by movement of said diaphragm, and a plurality of circumferentially spaced springs mounted on said housing and acting on the periphery of said plate to yieldingly urge said plate outwardly relative to said housing.

2. A bin level indicator comprising a housing having a central wall, a peripheral wall extending outwardly from one face of said central wall and defining an opening, a diaphragm mounted over said opening, a rod, a back-up plate fixed on said rod at the central portion thereof, said back-up plate being positioned adjacent said diaphragm between said diaphragm and said central wall and extending throughout a major portion of said diaphragm, a plurality of circumferentially spaced springs mounted in said peripheral wall and acting on the periphery of said back-up plate to yieldingly urge said back-up plate against said diaphragm, said back-up plate being unattached to said diaphragm, said central wall of said housing having an opening through which said rod extends to serve as the sole support for said back-up plate, a spring yieldingly urging the central portion of said back-up plate outwardly against said diaphragm, and a switch adjacent the other surface of said central wall and adapted to be actuated by movement of said rod.

3. In a sensing device which includes a housing and a diaphragm mounted on said housing and movable in response to presence of comminuted material adjacent one surface thereof, a back-up plate positioned adjacent the other surface of said diaphragm, a rod mounted in fixed position on said back-up plate, and a switch mounted on said housing and adapted to be actuated by movement of said rod, means for mounting and adjusting the position of said switch toward and away from said diaphragm comprising a support member pivotally mounted on said housing, said switch being fastened to said support member, means for moving said support member toward and away from said diaphragm about said pivot, and means independent of said latter means for limiting the pivotal movement of said support member on said housing toward and away from said diaphragm.

4. A bin level indicator comprising a housing having a central wall, a peripheral wall extending outwardly from one face of said central wall and defining an opening, a diaphragm mounted over said opening, a rod, a back-up plate fixed on said rod at the central portion thereof, said back-up plate being positioned adjacent said diaphragm between said diaphragm and said central wall and extending throughout a major portion of said diaphragm, a plurality of circumferentially spaced springs mounted in said peripheral wall and yieldingly urging said back-up plate against said diaphragm, said back-up plate being unattached to said diaphragm, said central wall of said housing having an opening through which said rod extends to serve as the sole support for said back-up plate, a spring yieldingly urging the central portion of said back-up plate outwardly against said diaphragm, said peripheral wall having a vent opening therethrough, and a switch adjacent the other surface of said central wall and adapted to be actuated by movement of said rod.

5. The combination set forth in claim 4 including filter means over said vent opening.

6. A bin level indicator comprising a housing having an open face a diaphragm closing said face of said housing, a switch mounted on said housing and adapted to be actuated by movement of the central portion of said diaphragm, a plurality of circumferentially spaced springs mounted on said housing about the periphery of said diaphragm and acting on the periphery of said diaphragm to yieldingly urge said diaphragm outward relative to said housing, means acting on the central portion of said diaphragm and yieldingly urging said diaphragm outwardly relative to said housing, and a plate mounted adjacent said diaphgram and extending throughout the major portion thereof, said circumferentially spaced springs acting on the periphery of said plate.

7. The combination set forth in claim 6 wherein each said circumferentially spaced spring comprises a compression spring.

8. The combination set forth in claim 6 including a rod fixed to said plate, said switch having an operating member adapted to be engaged and moved by said rod when the diaphragm is deflected by the presence of material adjacent the opposite surface thereof.

9. A bin level indicator comprising a housing having a central wall, a peripheral wall extending outwardly from one face of said central wall and defining an opening, a diaphragm mounted over said opening, a rod, a back-up plate fixed on said rod at the central portion thereof, said back-up plate being positioned adjacent said diaphragm between said diaphragm and said central wall and extending throughout a major portion of said diaphragm, a plurality of circumferentially spaced springs mounted in said periphal wall and yieldingly urging said back-up plate against said diaphragm, said back-up plate being unattached to said diaphragm, said central wall of said housing having an opening through which said rod extends to serve as the sole support for said back-up plate, a spring yieldingly urging the central portion of said back-up plate outwardly against said diaphragm, and a switch adjacent the other surface of said central wall and adapted to be actuated by movement of said rod each said circumferentially spaced spring comprising a helical spring.

10. A bin level indicator comprising a housing having a central wall, a peripheral wall extending outwardly from one face of said central wall and defining an opening, a diaphragm mounted over said opening, a rod, a back-up plate fixed on said rod at the central portion thereof, said back-up plate being positioned adjacent said diaphragm between said diaphragm and said central wall and extending throughout a major portion of said diaphragm, a plurality of circumferentially spaced springs mounted in said peripheral wall and yieldingly urging said back-up plate against said diaphragm, said back-up plate being unattached to said diaphragm, said central wall of said housing having an opening through which said rod extends to serve as the sole support for said back-up plate, a spring yieldingly urging the central portion of said back-up plate outwardly against said diaphragm, and a switch adjacent the other surface of said central wall and adapted to be actuated by movement of said rod, said spring acting on the central portion of said back-up plate comprising a helical spring surrounding said rod.

11. A bin level indicator comprising a housing having an open face, a diaphragm colsing said face of said housing, a switch mounted on said housing and adapted to be actuated by movement of said diaphragm, a plurality of circumferentially spaced springs mounted on said housing, and a plate mounted adjacent said diaphragm and extending throughout the major portion thereof, said circumferentially spaced springs acting on the periphery of said plate.

12. A bin level indicator comprising a housing having an open face, a diaphragm means closing the face of said housing, said diaphragm means including a central relatively rigid portion, a switch mounted on said housing and adapted to be actuated by movement of said central portion, and a plurality of circumferentially spaced springs mounted on said housing and acting on the periphery of said central portion.

13. The combination set forth in claim 3 wherein said switch includes a plunger, said switch being mounted on said support member in such a manner that the plunger is generally axially aligned with the end of said rod on said back-up plate.

References Cited in the file of this patent

UNITED STATES PATENTS

| | | |
|---|---|---|
| 1,379,803 | Covert | May 31, 1921 |
| 2,429,158 | Francis | Oct. 14, 1947 |
| 2,475,404 | Reed | July 5, 1949 |
| 2,633,509 | Fields et al. | Mar. 31, 1953 |
| 2,648,732 | Starbird | Aug. 11, 1953 |